United States Patent
He et al.

(10) Patent No.: US 12,231,393 B2
(45) Date of Patent: Feb. 18, 2025

(54) IP ADDRESS ALLOCATION IN A WIRELESS COMMUNICATION NETWORK

(71) Applicant: Telefonaktiebolaget LM Ericsson (publ), Stockholm (SE)

(72) Inventors: Yingjiao He, Shanghai (CN); Yunjie Lu, Shanghai (CN); Yong Yang, Kållered (SE); Wen Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/927,201

(22) PCT Filed: May 20, 2021

(86) PCT No.: PCT/CN2021/094869
§ 371 (c)(1),
(2) Date: Nov. 22, 2022

(87) PCT Pub. No.: WO2021/233375
PCT Pub. Date: Nov. 25, 2021

(65) Prior Publication Data
US 2023/0208804 A1    Jun. 29, 2023

(30) Foreign Application Priority Data
May 22, 2020    (WO) ................ PCT/CN2020/091899

(51) Int. Cl.
*H04L 45/74*    (2022.01)
*H04L 61/5007*    (2022.01)
*H04L 61/5061*    (2022.01)

(52) U.S. Cl.
CPC ...... *H04L 61/5007* (2022.05); *H04L 61/5061* (2022.05)

(58) Field of Classification Search
None
See application file for complete search history.

(56) References Cited

U.S. PATENT DOCUMENTS

| | | | |
|---|---|---|---|
| 7,788,345 B1 * | 8/2010 | Sukiman | H04L 61/5061 709/227 |
| 2006/0062228 A1 * | 3/2006 | Ota | H04L 12/2856 370/401 |

(Continued)

FOREIGN PATENT DOCUMENTS

| EP | 3402305 A1 | 11/2018 |
|---|---|---|
| KR | 20190090904 A * | 8/2019 |

OTHER PUBLICATIONS

Author Unknown, "Technical Specification Group Services and System Aspects; System architecture for the 5G System (5GS); Stage 2 (Release 16)," Technical Specification 23.501, Version 16.4.0, Mar. 2020, 3GPP Organizational Partners, 430 pages.

(Continued)

*Primary Examiner* — Christopher B Robinson
(74) *Attorney, Agent, or Firm* — Withrow & Terranova, PLLC

(57) ABSTRACT

There is provided a method performed by a user plane core network function for a wireless communication network. The user plane core network function is configured with a range of Internet Protocol addresses for allocation to user equipments. The method comprises: transmitting a message to a control plane core network function, the message comprising an indication of a usage level of the range of IP addresses.

18 Claims, 10 Drawing Sheets

(56) References Cited

U.S. PATENT DOCUMENTS

| | | | | |
|---|---|---|---|---|
| 2008/0101353 | A1* | 5/2008 | Streijl | H04L 61/5061 370/389 |
| 2017/0118275 | A1* | 4/2017 | Singh | H04L 61/5007 |
| 2019/0230061 | A1* | 7/2019 | Li | H04W 8/26 |
| 2020/0008126 | A1* | 1/2020 | Long | H04W 4/021 |
| 2020/0374765 | A1* | 11/2020 | Zong | H04W 76/12 |
| 2021/0044629 | A1* | 2/2021 | Hallenstål | H04L 65/1045 |

OTHER PUBLICATIONS

Author Unknown, "Technical Specification Group Core Network and Terminals; Interface between the Control Plane and the User Plane Nodes; Stage 3 (Release 16)," Technical Specification 29.244, Version 16.3.1, Apr. 2020, 3GPP Organizational Partners, 297 pages.

Ericsson, "C4-204272: Report of Ue Ip address Allocation Status," 3GPP TSG-CT WG4 Meeting #99e, Aug. 18-28, 2020, E-Meeting, 16 pages.

Xie, et al., "ARPIM: IP Address Resource Pooling and Intelligent Management System for Broadband IP Networks," IEEE Communications Magazine, vol. 55, Issue 6, Jun. 2017, pp. 55-61.

International Search Report and Written Opinion for International Patent Application No. PCT/CN2021/094869, mailed Sep. 24, 2021, 16 pages.

International Preliminary Report on Patentability for International Patent Application No. PCT/CN2021/094869, mailed Aug. 5, 2022, 61 pages.

Ericsson, "C4-203240: UE IP address Allocation," 3GPP TSG-CT WG4 #98e, Jun. 2-12, 2020, Electronic Meeting, 16 pages.

Decision to Grant for Japanese Patent Application No. 2022-570456, mailed Dec. 5, 2023, 5 pages.

* cited by examiner

|   | Bits | | | | | | | |
|---|---|---|---|---|---|---|---|---|
| Octets | 8 | 7 | 6 | 5 | 4 | 3 | 2 | 1 |
| 1 to 2 | Type = 101 (decimal) | | | | | | | |
| 3 to 4 | Length = n | | | | | | | |
| 5 | Spare | Spare | Spare | UIAAR | GPQR | CKDR | UPRR | UPFR |
| 6 to (n+4) | These octet(s) is/are present only if explicitly specified | | | | | | | |

Figure 11

|   | Bits | | | | | | | |
|---|---|---|---|---|---|---|---|---|
| Octets | 8 | 7 | 6 | 5 | 4 | 3 | 2 | 1 |
| 1 to 2 | Type = 19 (decimal) | | | | | | | |
| 3 to 4 | Length = n | | | | | | | |
| 5 | Cause value | | | | | | | |

Figure 12

IP ADDRESS ALLOCATION IN A WIRELESS COMMUNICATION NETWORK

This application is a 35 U.S.C. § 371 national phase filing of International Application No. PCT/CN2021/094869, filed May 20, 2021, which claims the benefit of International Application No. PCT/CN2020/091899, filed May 22, 2020, the disclosures of which are incorporated herein by reference in their entireties.

TECHNICAL FIELD

Embodiments of the disclosure generally relate to communication, and, more particularly, to methods and apparatuses relating to IP address allocation in a wireless communication network.

BACKGROUND

This section introduces aspects that may facilitate better understanding of the present disclosure. Accordingly, the statements of this section are to be read in this light and are not to be understood as admissions about what is in the prior art or what is not in the prior art.

When a user equipment (UE) connects to a wireless communication network, an Internet Protocol (IP) address is allocated to the UE by the core network, to enable easy data connectivity between the UE and a packet data network (PDN). Prior to release 16 of the $3^{rd}$ Generation Partnership Project (3GPP), IP addresses were allocated to UEs by control plane functions within the core network, such as the PDN Gateway in the control plane (PGW-C). In Release 16 of the 3GPP specifications, allocation of UE IP addresses by user plane (UP) functions was introduced.

The UP function may therefore manage and allocate the UE IP addresses for each PDN or protocol data unit (PDU) session. The UP function receives a request to establish a session from a control plane (CP) function, such as a packet forwarding control protocol (PFCP) Session Establishment Request, allocates the UE IP address and sends it in a PFCP Session Establishment Response to the CP function. The CP function may be a PDN gateway in the control plane (PGW-C) or a session management function (SMF), for example.

3GPP technical specification (TS) 29.244, v 16.3.1 sets out the detail regarding this process as follows (see section 5.21.3):

When performing UE IP address/prefix allocation in the UP function, the CP function shall request the UP function to allocate the UE IP address/prefix by:

setting the CHOOSE flags (CHOOSE IPV4 and/or CHOOSE IPV6) in the UE IP Address information element (IE) of the packet detection rule (PDR) IE (see Table 7.5.2.2-1) or of the Traffic Endpoint (see Table 7.5.2.7-1); the IPv6 prefix length shall be indicated in the UE IP Address if an IPv6 prefix other than default/64 and other than for IPv6 prefix delegation (see clause 5.14) is to be assigned and the user plane function (UPF) indicated support of the IP6PL feature (see clause 8.2.25); and including the Network Instance IE to indicate the IP address pool from which the UE IP address/prefix is to be assigned.

optionally including the UE IP address Pool Identity from which the UE IP address shall be allocated by the UP function.

The CP function may request the UP function to allocate the same UE IP address/prefix to several PDRs to be created within one single PFCP Session Establishment Request or PFCP Session Modification Request by:

setting the CHOOSE flags (CHOOSE IPV4 and/or CHOOSE IPV6) in the UE IP Address IE of each PDR to be created with a new UE IP address/prefix;

or, if the UP function indicated support of the packet detection information (PDI) optimization (see clause 8.2.25), by:

including the UE IP Address IE only in the Create Traffic Endpoint IE and by setting the CHOOSE flags (CHOOSE IPV4 and/or CHOOSE IPV6) in the UE IP Address IE of this IE; and including the Traffic Endpoint ID in all the PDRs to be created with the same UE IP address.

If the PDR(s) is created successfully, the UP function shall return the UE IP address/prefix it has assigned to the PDR(s) or to the Traffic Endpoint(s) in the PFCP Session Establishment Response or PFCP Session Modification Response.

Upon receiving a request to delete a PFCP session, to remove a Traffic Endpoint, or to remove the last PDR associated with the UE IP address/prefix, the UP function shall release the UE IP address/prefix that was assigned to the PFCP session, to the Traffic Endpoint, or to the PDR.

Embodiments of the disclosure may thus be implemented in a 5th generation (5G) core network. FIG. 1 illustrates the architecture for the 5G system. As shown, the 5G system comprises a user equipment (UE), a (radio) access network ((R)AN), a user plane function (UPF), a data network (DN), an authentication server function (AUSF), an access and mobility management function (AMF), a session management function (SMF), a service communication proxy (SCP), a network slice selection function (NSSF), a network exposure function (NEF), a network repository function (NRF), a policy control function (PCF), a unified data management (UDM) and an application function (AF).

The 5G architecture is defined as service-based and the interaction between network functions (NFs) is represented in two ways. One way is a service-based representation, where NFs (e.g. AMF) within the control plane enables other authorized NFs to access their services. This representation also includes point-to-point reference points where necessary. The other way is a reference point representation, which shows the interaction existing between the NF services in the NFs described by point-to-point reference point (e.g. N11) between any two NFs (e.g. AMF and SMF).

The NEF supports external exposure of capabilities of NFs. External exposure can be categorized as monitoring capability, provisioning capability, policy/charging capability and analytics reporting capability. The monitoring capability is for monitoring of specific event for UE in the 5G system and making such monitoring events information available for external exposure via the NEF. The provisioning capability is for allowing an external party to provision of information which can be used for the UE in the 5G system. The policy/charging capability is for handling quality of service (QoS) and charging policy for the UE based on the request from an external party. The analytics reporting capability is for allowing an external party to fetch or subscribe/unsubscribe to analytics information generated by the 5G system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to reduce network resource wastage and delay through failed requests for UE IP address allocation by a UP function.

According to a first aspect of the disclosure, there is provided a method performed by a user plane core network function for a wireless communication network. The user plane core network function is configured with a range of IP addresses for allocation to UEs. The method comprises: transmitting a message to a control plane core network function. The message comprises an indication of a usage level of the range of IP addresses.

According to a second aspect of the disclosure, there is provided a method performed by a control plane core network function for a wireless communication network. The method comprises: receiving messages from one or more user plane core network functions. The user plane core network functions are configured with respective ranges of IP addresses for allocation to UEs. At least one of the messages comprises an indication of a usage level of the range of IP addresses. The method further comprises selecting a user plane core network function for allocating an IP address to a UE based on the indicated usage levels.

Embodiments of the disclosure have the technical advantage of reducing the likelihood of failure when requesting a UP function to allocate an IP address to a UE. In this way, delay in establishing a PDU/PDN session for the UE is reduced, and network resources utilized more efficiently.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 11 shows a structure of a Node Report Type IE according to an embodiment of the disclosure; and FIG. 12 shows a structure of a Cause IE according to an embodiment of the disclosure.

DETAILED DESCRIPTION

For the purpose of explanation, details are set forth in the following description in order to provide a thorough under- standing of the embodiments disclosed. It is apparent, however, to those skilled in the art that the embodiments may be implemented without these specific details or with an equivalent arrangement.

One problem identified by the inventors relates to UE IP address allocation by UP core network functions, such as the 3GPP-defined user plane function (UPF) and the PGW-U. UP functions configured to provide this functionality have a finite range of IP addresses for dynamic allocation to UEs. However, the CP function requesting UE IP address allocation may not know if that range has been used up in the UP function, or is close to being used up; the CP function may still select the UP function to allocate an IP address to a UE. If all dynamic IP addresses are occupied (e.g., already allocated to other UEs) or if all the dynamic IP address in the UE IP address pool indicated by the CP function are occupied, the UP function will reject the PFCP Session Establishment Request. The allocation of an IP address to the UE is thus delayed, and network resources are wasted (e.g., used in a failed request for IP address allocation). Even after such a failed request, the CP function may continue to select the UP function for UE IP address allocation, as the request may have been rejected for reasons other than all dynamic IP addresses being occupied.

Figure 1:
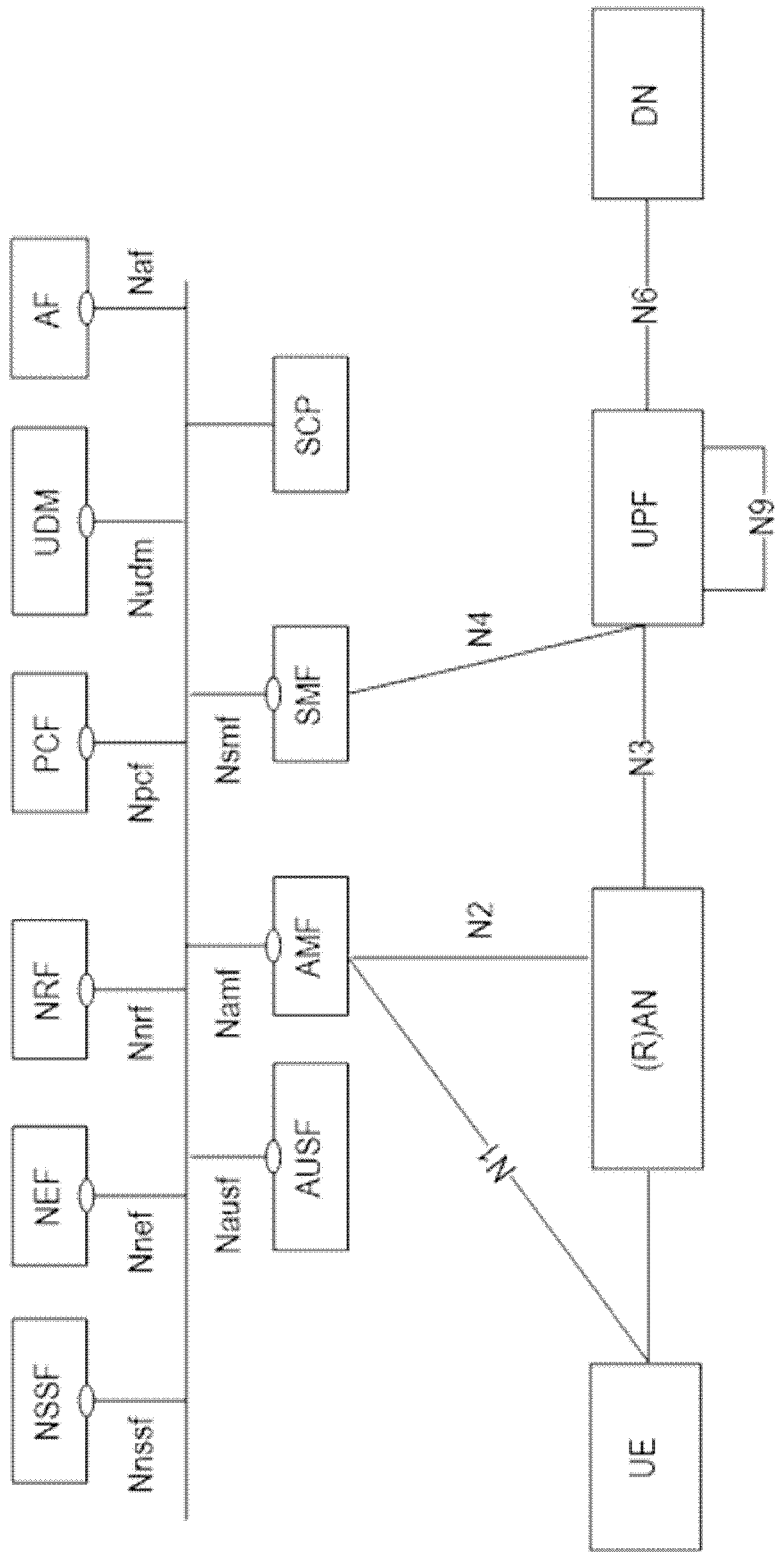
FIG. 1 is a diagram illustrating the architecture for the 5G system.

The present disclosure proposes an improved solution for UE IP address allocation by UP core network functions. As an exemplary example, the solution may be applied to the communication system shown in FIG. 1. The functional description of the entities shown in FIG. 1 is specified in clause 6 of 3GPP TS 23.501, v 16.4.0, which is incorporated herein by reference in its entirety. Alternatively, the embodiments may be implemented in other networks including a separation between user and control planes, and where the user plane is utilized to allocate IP addresses for wireless devices.

Note that within the context of this disclosure, the term terminal device (or UE) used herein may also be referred to as, for example, access terminal, mobile station, mobile unit, subscriber station, or the like. It may refer to any (a stationary or mobile) end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), an integrated or embedded wireless card, an externally plugged in wireless card, or the like.

In an Internet of things (IoT) scenario, a terminal device (or UE) may represent a machine or other device that performs monitoring and/or measurements, and transmits the results of such monitoring and/or measurements to another terminal device (or UE) and/or a network equipment. In this case, the terminal device (or UE) may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node (or network entity) in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future. In addition, the specific terms used herein do not limit the present disclosure only to the communication system related to the specific terms, which however can be more generally applied to other communication systems.

As used herein, the term "UP core network function" refers to core network functions in the user plane, and includes the UPF and PGW-U as examples. The term "UP function" is also used for this purpose. The acronym "UPF" explicitly refers to the core network function defined in the 3GPP specifications as the user plane function, e.g., in 3GPP TS 23.501, v 16.4.0, section 6.2.3. The terms "CP function" and "CP core network function" are synonymous, and refer to core network functions in the control plane, such as PGW-C and SMF.

Thus, as described above, a UP function in a wireless communication network such as that shown in FIG. 1 can be configured with a range of IP addresses for allocation to UEs. Upon receiving a request message from a CP function, the UP function allocates an available IP address from its range of IP addresses, and transmits a response message comprising an indication of the allocated IP address. However, the range of IP addresses may become used up, such that the UP function is no longer able to allocated IP addresses to UEs.

According to embodiments of the disclosure, the UP function is configured to transmit a message to a CP function comprising an indication of a usage level of its range of IP addresses. In this way, the CP function is informed of the usage level in the UP function, and can take this into account in future when selecting a UP function to request allocation of an IP address to a UE. For example, the CP function may choose not to select (or to select with lower frequency or probability) a UP function which reported a high usage level or an absence of available IP addresses.

The indication of the usage level may comprise an indication of the proportion of the range of IP addresses which is currently allocated, such as a percentage. The indication of the proportion may be implicit or explicit. In the former case, for example, the indication may be of the proportion of the range of IP addresses which is currently available. As IP addresses may be either allocated or available, an indication of the proportion of the former is an implicit indication of the proportion of the latter, and vice versa.

The indication of the usage level may additionally or alternatively comprise an absolute number of available IP addresses in the range. Again, the indication of the absolute number may be implicit or explicit. In the former case, for example, the indication may comprise an indication of the total number of IP addresses in the range (both available and allocated) and the number of allocated IP addresses. The number of available IP addresses can thus be derived from these quantities by subtraction.

The message may comprise a response message to a request from the CP function for allocation of an IP address to a UE. Examples of this embodiment are shown below in FIGS. 2 and 3. The indication of the usage level may be included in such messages responsive to the usage level exceeding a threshold, for example. In this way, network resources are not utilized for reporting the usage level unless and until the usage level reaches a value at which it becomes likely that a request to allocate an IP address to a UE may be refused owing to the IP addresses all being allocated. Alternatively, the message may be transmitted autonomously by the UP function, e.g., in response to a subscription request from the CP function. In this case, the message may be transmitted responsive to the usage level exceeding a threshold, for example. Examples of this embodiment are shown below in FIGS. 4 and 5.

The range of IP addresses configured in the UP function may comprise one or more UE IP address pools. Each of the UE IP address pools may be associated with a particular network instance configured in the UP function. That is, each network instance of the UP function may be associated with one or more UE IP address pools.

The IP addresses may be allocated to a UE for each PDN or PDU session, for example upon establishment of such a session. Thus a UE may have multiple IP addresses if it has multiple PDN or PDU sessions.

Additionally or alternatively, some embodiments provide a mechanism by which a UP function can report that a failure to allocate an IP address to a UE was caused by the range of IP addresses in the UP function being used up.

Figure 2:
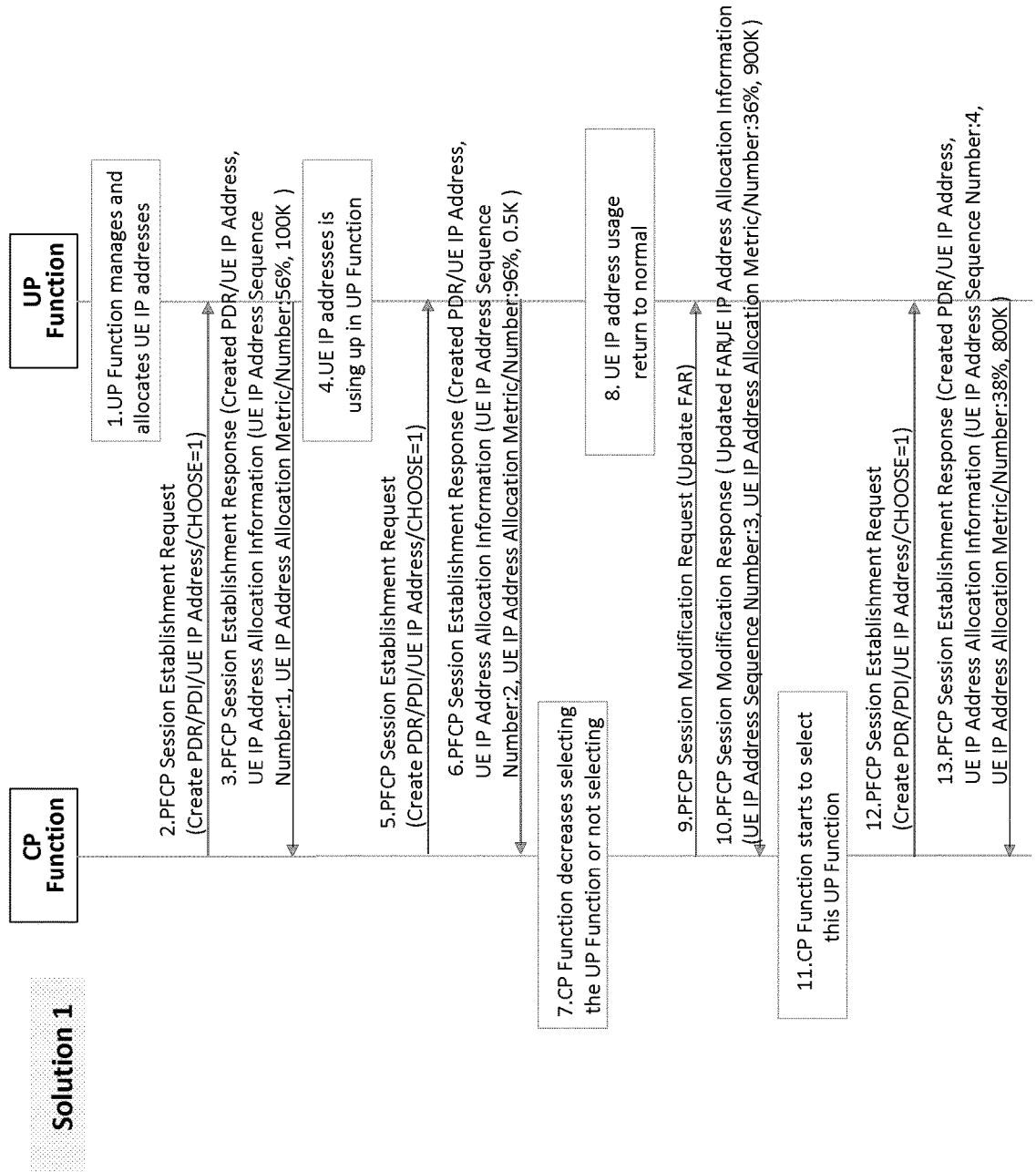
FIG. 2 is a signaling diagram showing signaling according to embodiments of the disclosure.

FIG. 2 is a signaling diagram showing signaling according to an embodiment of the disclosure, between a CP function and a UP function. The CP function may correspond to, for example, a PGW-C or an SMF. The UP function may correspond to, for example, a PGW-U or a UPF. In one embodiment, where the CP function corresponds to a PGW-C and the UP function corresponds to a PGW-U, transmissions between the network functions take place via the Sxb interface. In another embodiment, where the CP function corresponds to a SMF and the UP function corresponds to a UPF, transmissions between the network functions take place via the N4 interface. In further embodiments, different UP functions and CP functions may be utilized, and messages transmitted over different interfaces (such as the Sxa and Sxc interfaces).

In step 1, the UP function is configured to manage and allocate IP addresses to UEs, e.g., as described above.

In step 2, the CP function sends a request message (such as a PFCP Session Establishment Request) to the UP function, requesting that the UP function allocate an IP address to the UE associated with the session which is to be established. In accordance with 3GPP TS 29.244, v 16.3.1, the request to allocate the IP addresses may be indicated with Create PDR/PDI/UE IP Address/CHOOSE, where a CHOOSE value of 1 indicates that the CP function requires the UP function to allocate the UE IP address for this PDN/PDU session.

In step 3, the UP function allocates the UE IP address and transmits a response message (such as a PFCP Session Establishment Response) comprising an indication of the allocated IP address to the CP function. The allocated UE IP address may be associated with one or several PDRs. In addition, according to embodiments of the disclosure, the response message comprises a new IE: UE IP Address Allocation Information. The IE comprises an indication of the usage level of the range of IP addresses configured in the UP function. In the illustrated example, this comprises an indication of the proportion (e.g., percentage) of the IP address range which is allocated (UE IP Address Allocation Metric:56%) and an indication of the absolute number of IP addresses which are available, i.e., not allocated (the number of UE IP address: 100K). In addition, the IE comprises a sequence number (UE IP Address Sequence Number: 1) associated with the information element, which enables the CP function to determine the current usage level in the UP function, and not a previously indicated usage level, by utilizing the usage level with the most recent (e.g., highest) sequence number. In some embodiments, this sequence number is incremented with each indication of usage level (e.g., each transmission of the UE IP Address Allocation Information IE); alternatively, the sequence number may be incremented each time the usage level changes. Table 1 below shows a list of the information elements which may be included in the message transmitted in step 3. The list includes a new IE, UE IP Address Allocation Information, which comprises the indication of usage level according to embodiments of the disclosure.

In step 4, the range of IP addresses in the UP function is almost used up.

In step 5, for another new PDU/PDN session, the CP function again sends a request message (e.g., PFCP Session Establishment Request with Create PDR/PDI/UE IP Address/CHOOSE) indicating that the CP function requires the UP function to allocate a UE IP address for this PDN/PDU session.

In step 6, similar to step 3 above, the UP function again allocates the UE IP address and sends a response message to the CP function (e.g., PFCP Session Establishment Response Created PDR/UE IP Address) with an indication of the allocated IP address. Again, similar to step 3, this message includes a new IE comprising an indication of the usage level of the IP address range. In this message, the sequence number has been incremented (i.e., UE IP Address Sequence Number: 2), and the indication of usage level shows a higher proportion of allocated addresses (UE IP Address Allocation Metric:96%) and fewer available IP addresses (UE IP address: 0.5K).

Based on the indicated usage level, in step 7 the CP function adapts an algorithm used to select UP functions to allocate IP addresses to a UE. For example, the algorithm may be adapted such that the UP function is less likely to be selected, or is selected less often. In one embodiment, the algorithm may be adapted such that the UP function is not selected to allocate IP addresses to UEs.

In step 9, the CP function sends a message relating to an ongoing PDN/PDU session associated with the UP function. For example, the message may comprise a request to modify some aspect of the session, such as a PFCP Session Modification Request.

In step 10, the UP function transmits a response message to the message sent in step 9 (e.g., a PFCP Session Modification Response) to the CP function. In step 8, prior to step 9, the usage of the IP address range in the UP function had returned to lower values. For example, the PDN/PDU sessions associated with some of the allocated IP addresses may have been terminated. Thus the response message transmitted in step 10 comprises an indication of the new, lower usage level of the range of IP addresses. In this message, the sequence number has again been incremented (i.e., UE IP Address Sequence Number: 3), and the indication of usage level shows the lower proportion of allocated addresses (UE IP Address Allocation Metric:36%) and more available IP addresses (UE IP address: 900K). Table 2 below shows a list of the information elements which may be included in the message transmitted in step 10. The list includes a new IE, UE IP Address Allocation Information, which comprises the indication of usage level according to embodiments of the disclosure.

Based on the indicated usage level, in step 11 the CP function again adapts an algorithm used to select UP functions to allocate IP addresses to a UE. For example, the algorithm may be adapted such that the UP function is more likely to be selected, or is selected more often. In one embodiment, the algorithm may be adapted such that the CP function begins to select the UP function to allocate IP addresses to UEs again.

In step 12, the CP function selects the UP function to allocate an IP address to a UE, and accordingly sends a request message (e.g., PFCP Session Establishment Request with Create PDR/PDI/UE IP Address/CHOOSE) to the UP function, similar to steps 2 and 5 above.

In step 13, the UP function allocates the UE IP address and sends a response message to the CP function (e.g., PFCP Session Establishment Response Created PDR/UE IP Address) with an indication of the allocated IP address. The response message comprises an indication of the current usage level of the range of IP addresses (UE IP Address Sequence Number: 4, UE IP Address Allocation Metric: 38%, the number of UE IP address: 800K).

In one embodiment, the indication of the usage level of the range of IP addresses in the UP function is included in the response messages (e.g., those transmitted in steps 3, 6, 10 and 13) responsive to the usage level exceeding a threshold. For example, the threshold may relate to the proportion of IP addresses which are allocated, and be set at a value which is relatively close to full usage of the range of IP addresses (e.g., 80% or 90%). Alternatively, the threshold may relate to the number of available IP addresses, and be set at a value which is relatively low (e.g., 1K). If the response message does not include an indication of the usage level, therefore, the CP function can assume that the usage level is not high and the UP function can be selected for the allocation of IP addresses to UEs.

Although not shown in FIG. 2, it may happen that the range of IP addresses in the UP function is entirely allocated and thus one of the request messages received in steps 2, 5, 9 and 12 may result in failed allocation of an IP address to the UE. In this case, the response messages transmitted in steps 3, 6, 10 and 13 may comprise an indication that the IP address allocation failed, instead of an indication of the IP address allocated to the UE. According to embodiments of the disclosure, the response message may additional comprise an indication that the cause of the failure was a fully allocated range of IP addresses. The indication may be contained within a cause IE, such as that shown in FIG. 12. The cause value indicates both whether the request to allocate an IP address to a UE was successful or not, and the reasons behind the rejection if the request was rejected. Table 8 below shows the possible cause values which may be included in such a response message. It can be seen that an additional cause value (given the unassigned value xx) is included to indicate that the request was rejected because all dynamic IP addresses are allocated.

Figure 3:
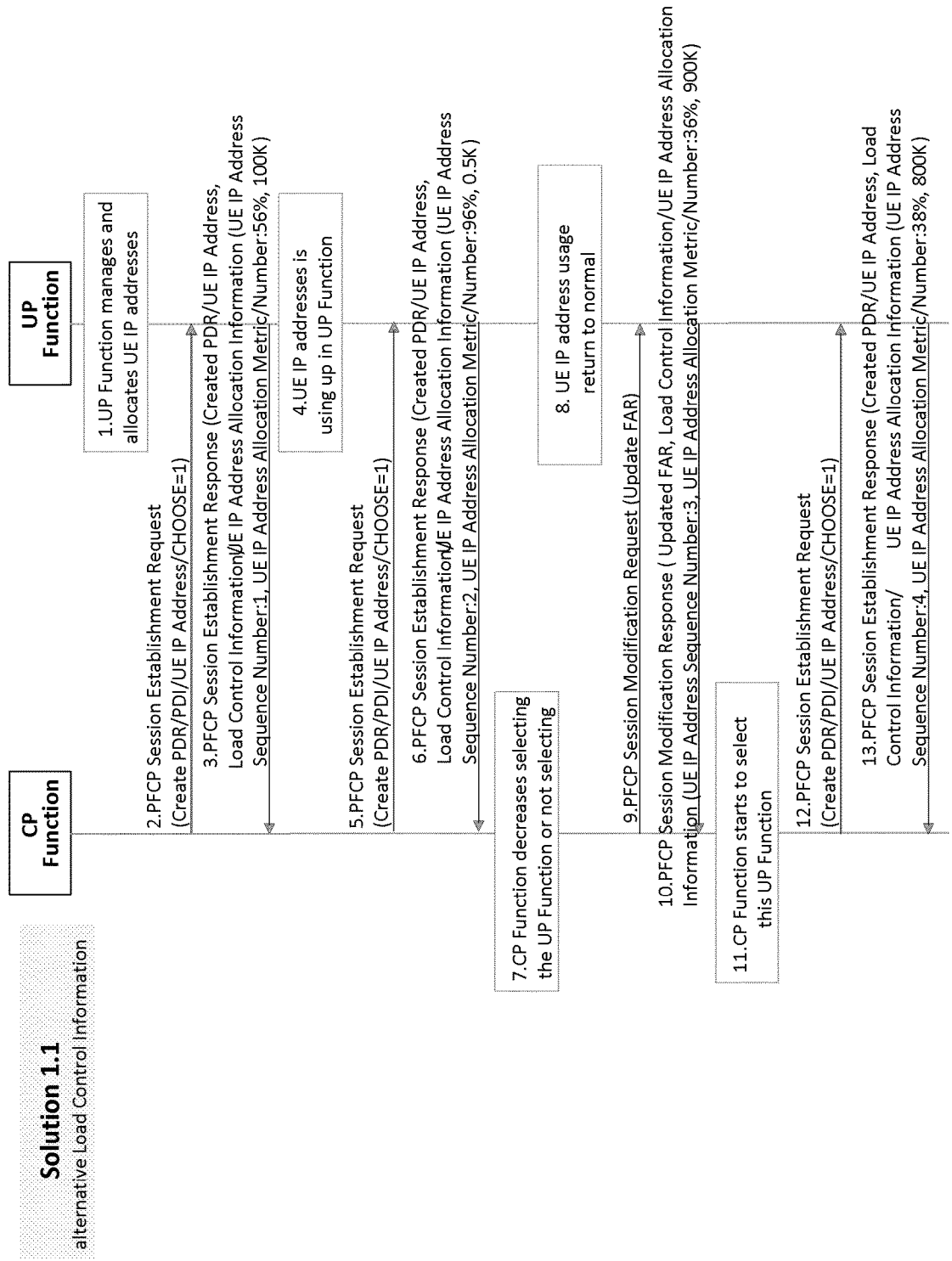
FIG. 3 is a signaling diagram showing signaling according to further embodiments of the disclosure.

FIG. 3 is a signaling diagram showing signaling according to a further embodiment of the disclosure. This embodiment corresponds closely to that shown in FIG. 2 and described above, with the difference that the indication of the usage level of the range of IP addresses in the UP function is not set out in a dedicated IE, but is instead a sub-IE within another IE, such as the Load Control Information IE. Table 3 below shows the Load Control Information IE according to this embodiment. The IE includes a new sub-IE, UE IP Address Allocation Information, which comprises the indication of usage level according to embodiments of the disclosure.

Figure 4:
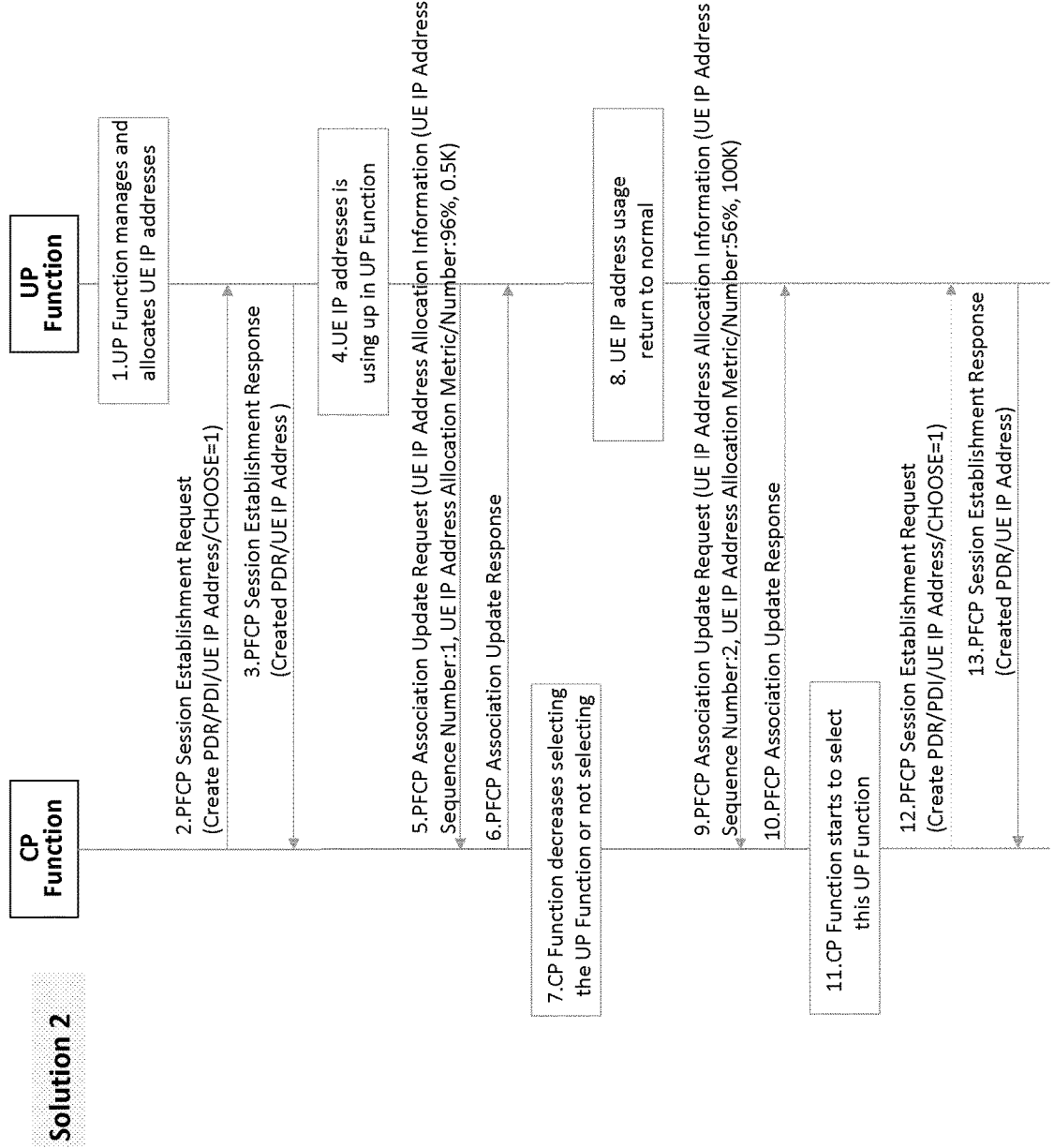
FIG. 4 is a signaling diagram showing signaling according to further embodiments of the disclosure.

FIG. 4 is a signaling diagram showing signaling according to a further embodiment of the disclosure. In this embodiment, the indication of a usage level of the range of IP addresses is transmitted autonomously by the UP function, i.e., not in response to a message from the CP function.

For example, the UP function may transmit such a message responsive to the usage level exceeding a threshold, or moving below a threshold.

Steps 1 to 4 are similar to steps 1 to 4 of FIGS. 2 and 3 above, with the exception that the response message transmitted in step 3 does not include any indication of the usage level of the range of IP addresses as described above. The UP function is responsible for managing and allocating UE IP address for each PDN/PDU sessions.

In step 5, the UP function sends a message to the CP function comprising an indication of the usage level of the range of IP addresses in the UP function. The message may be a PFCP Node Report Request or, as shown in FIG. 4, a PFCP Association Update Request. The indication of the usage level may be contained within a dedicated IE, as described above. In the illustrated example, this comprises an indication of the proportion (e.g., percentage) of the IP address range which is allocated (UE IP Address Allocation Metric:96%) and an indication of the absolute number of IP addresses which are available, i.e., not allocated (the number of UE IP address: 0.5K). In addition, the IE comprises a sequence number (UE IP Address Sequence Number: 1) associated with the information element, which enables the CP function to determine the current usage level in the UP function, and not a previously indicated usage level, by utilizing the usage level with the most recent (e.g., highest) sequence number. Table 4 below shows the IEs which may be included in the message transmitted in step 5 (and also in step 9 described below). The list includes a new IE, UE IP Address Allocation Information, which comprises the indication of usage level according to embodiments of the disclosure.

In one embodiment, the message is transmitted in step 5 responsive to the usage level exceeding a threshold. For example, the threshold may relate to the proportion of IP addresses which are allocated, and be set at a value which is relatively close to full usage of the range of IP addresses (e.g., 80% or 90%). Alternatively, the threshold may relate to the number of available IP addresses, and be set at a value which is relatively low (e.g., 1K).

In step 6, the CP function transmits a response message to the UP function, e.g., a PFCP Node Report Response or, as illustrated, a PFCP Association Update Response.

Steps 7 and 8 are similar to steps 7 and 8 described above with respect to FIGS. 2 and 3. Thus the CP function adapts an algorithm used to select UP functions to allocate IP addresses to a UE. For example, the algorithm may be adapted such that the UP function is less likely to be selected, or is selected less often. In one embodiment, the algorithm may be adapted such that the UP function is not selected to allocate IP addresses to UEs. At some later time, the usage level falls in step 8.

In step 9, the UP function sends transmits a message to the CP function (e.g., PFCP Node Report Request or PFCP Association Update Request). The message comprises an indication of the new, lower usage level of the range of IP addresses. In this message, the sequence number has been incremented (i.e., UE IP Address Sequence Number: 2), and the indication of usage level shows the lower proportion of allocated addresses (UE IP Address Allocation Metric:56%) and more available IP addresses (UE IP address: 100K).

In one embodiment, the message is transmitted in step 9 responsive to the usage level falling below a threshold. For example, the threshold may relate to the proportion of IP addresses which are allocated, or to the number of available IP addresses. The threshold may have the same value as that discussed above with respect to step 5, or a different value (e.g., a lower value) such that messages are not transmitted with increased frequency where the usage level is at or near to the threshold.

In step 10, the CP function sends a response message (e.g., PFCP Node Report Response or PFCP Association Update Response) to the UP function.

Steps 11 to 13 are similar to steps 11 to 13 described above with respect to FIGS. 2 and 3, with the exception that the response message transmitted in step 13 does not comprise an indication of the usage level of the range of IP addresses in the UP function.

Figure 5:
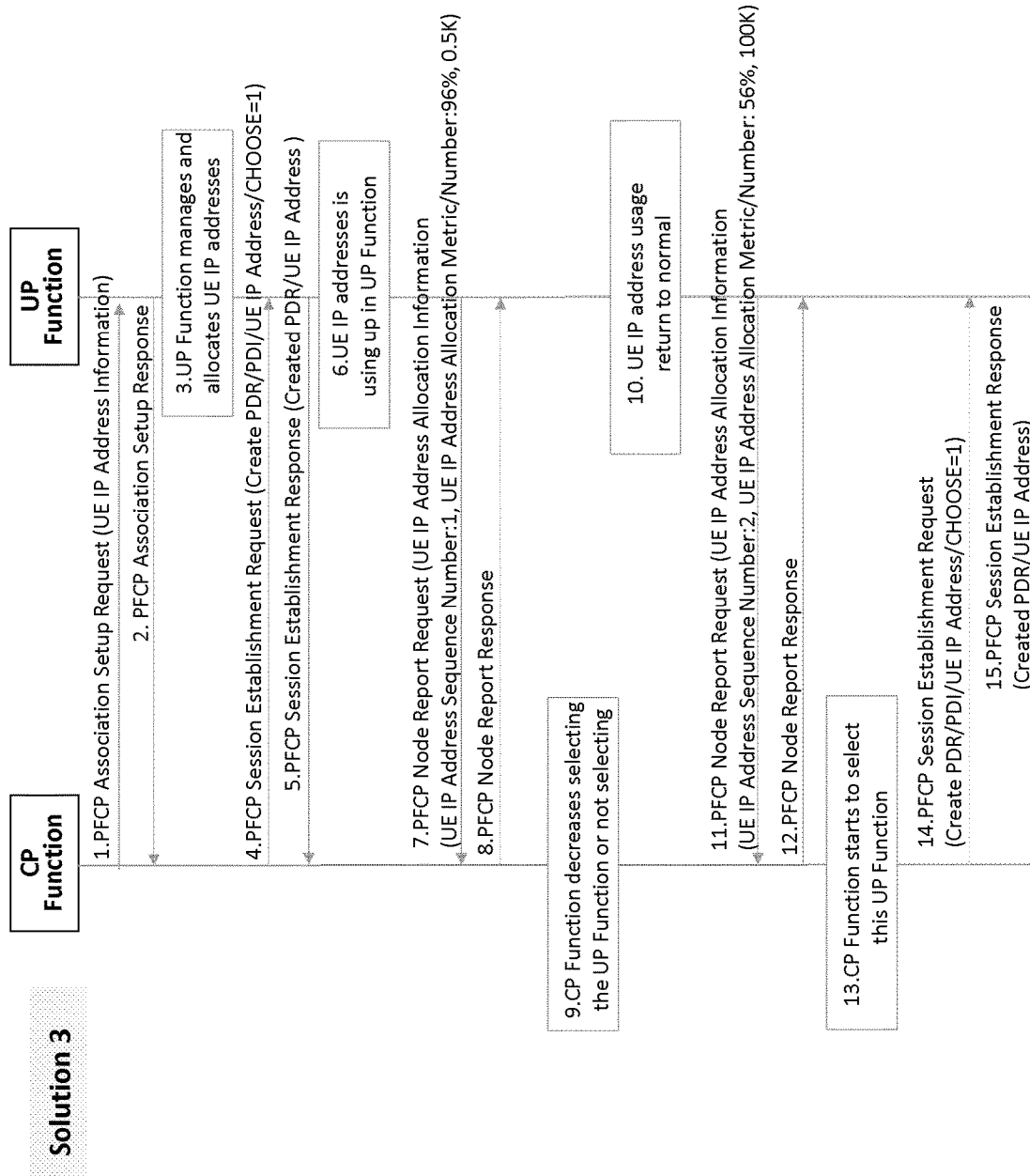
FIG. 5 is a signaling diagram showing signaling according to further embodiments of the disclosure.

FIG. 5 is a signaling diagram showing signaling according to further embodiments of the disclosure. In this embodiment, the indication of a usage level of the range of IP addresses is transmitted by the UP function under the terms of a subscription by the CP function. Again, in this example, the UP function may transmit indications of the usage level responsive to the usage level exceeding a threshold, or moving below a threshold.

In step 1, the CP function transmits a subscription request message (e.g., PFCP Association Setup Request) to the UP function, for the UP function to report the usage level of its range of IP addresses. The subscription request message may comprise one or more conditions upon which the usage level should be reported. For example, the conditions may include one or more of: a threshold usage level above which the usage level should be reported; a threshold usage level below which the usage level should stop being reported; how often the usage level should be reported. In one embodiment, the conditions may comprise a plurality of threshold values such that the UP function reports its usage level when the usage level moves past a particular threshold value. Table 5 below shows the IEs which may be included in the message transmitted in steps 7 and 11 of FIG. 5. The list includes a new IE, UE IP Address Allocation Information, which comprises a request for the UP function to report its usage level, and may also contain indications of the one or more conditions.

In step 2, the UP function sends a response or acknowledgement message (e.g., PFCP Association Setup Response) to the CP function. Thereafter, indications of the usage level are transmitted to the CP function by the UP function under the conditions set out in the subscription. Steps 3 to 15 otherwise correspond to steps 1 to 13, respectively, described above with respect to FIG. 4.

Table 6 below shows the IEs which may be included in the message transmitted in steps 7 and 11 of FIG. 5. The list includes a new IE, UE IP Address Allocation Information, which comprises the indication of usage level according to embodiments of the disclosure. FIG. 11 shows the structure of the Node Report Type IE listed in Table 6. It can be seen that Bit 5 of Octet 5 comprises a bit for UE IP Address Allocation Information (UIAAR), which is set (e.g., to "1") to indicate the presence of a UE IP Address Allocation Information IE in the message. The message transmitted in steps 7 and 11 (e.g., PFCP Node Report Request) may be sent over the Sxa, Sxb, Sxc and N4 interface by the UP function to report information to the CP function that is not specific to a PFCP session.

Figure 6:
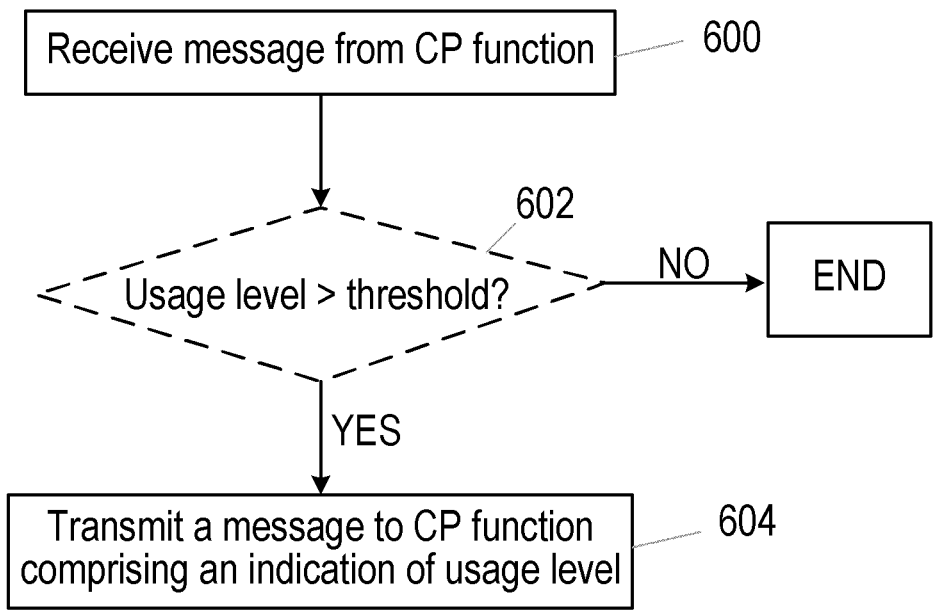
FIG. 6 is a flowchart illustrating a method implemented at a user plane core network function according to an embodiment of the disclosure.

FIG. 6 is a flowchart illustrating a method implemented at a UP function according to an embodiment of the disclosure. The flowchart may correspond in some parts to signaling performed by the UP function in any of FIGS. 2 to 5. The UP function may correspond to a UPF or a PGW-U, for example. The UP function is configured with a range of IP addresses for allocation to UEs. The range of IP addresses configured in the UP function may comprise one or more UE IP address pools. Each of the UE IP address pools may be associated with a particular network instance configured in the UP entity. That is, each network instance of the UP function may be associated with one or more UE IP address pools.

At block 600, the UP function receives a message from a CP function. The message may comprise a request for the UP function to allocate an IP address to a UE, for example as part of a request to establish a PDU or PDN session for the UE. See steps 2 of FIGS. 2 and 3, for example. In these examples, the request message may comprise an indication of the network instance of the UP function, and may also contain an identifier of the UE IP address pool from which the IP address is to be allocated by the UP function. Alternatively, the message may comprise a subscription request for the UP function to report its usage level. See step 1 of FIG. 5, for example.

Block 602 sets out an optional embodiment in which the UP function reports its usage level to the CP function if that usage level exceeds a threshold. Thus, in block 602, the UP function determines whether the usage level of its configured range of IP addresses is above a threshold. For example, the threshold may relate to a proportion of IP addresses which are allocated, and be set at a value which is relatively close to full usage of the range of IP addresses (e.g., 80% or 90%). Alternatively, the threshold may relate to a number of available IP addresses, and be set at a value which is relatively low (e.g., 1K). If the usage level does not exceed the threshold, the method ends and the UP function does not report its usage level to the CP function. For example, the UP function may not respond to the message received in step 600 (particularly if the message was a subscription request), or may respond without any indication of its usage level (particularly if the message was a request for the UP function to allocate an IP address to a UE). If the usage level does exceed the threshold, the method proceeds to step 604 and the UP function reports its usage level to the CP function. Alternatively, the UP function may not be configured in this manner, and may proceed directly to step 604 after step 600.

In step 604, the UP function transmits a message to the CP function comprising an indication of the usage level of the range of IP addresses in the UP function. The indication of the usage level may comprise an indication of the proportion of the range of IP addresses which is currently allocated, such as a percentage. The indication of the proportion may be implicit or explicit. In the former case, for example, the indication may be of the proportion of the range of IP addresses which is currently available. As IP addresses may be either allocated or available, an indication of the proportion of the former is an implicit indication of the proportion of the latter, and vice versa. The indication of the usage level may additionally or alternatively comprise an absolute number of available IP addresses in the range. Again, the indication of the absolute number may be implicit or explicit. In the former case, for example, the indication may comprise an indication of the total number of IP addresses in the range (both available and allocated) and the number of allocated IP addresses. The number of available IP addresses can thus be derived from these quantities by subtraction.

According to some embodiments of the disclosure, the message may comprise a sequence number associated with the indication of a usage level of the range of IP addresses, which enables the CP function to determine the current usage level in the UP function, and not a previously indicated usage level, by utilizing the usage level with the most recent (e.g., highest) sequence number. In some embodiments, this sequence number is incremented with each indication of usage level (e.g., each transmission of the UE IP Address Allocation Information IE); alternatively, the sequence number may be incremented each time the usage level changes.

The message transmitted in step 604 may comprise a response message to a request from the CP function for allocation of an IP address to a UE. Examples of this embodiment are shown above in FIGS. 2 and 3 (see, e.g., steps 3 in those Figures). The indication of the usage level may be included in such messages responsive to the usage level exceeding a threshold, for example. In this way, network resources are not utilized for reporting the usage level unless and until the usage level reaches a value at which it becomes likely that a request to allocate an IP address to a UE may be refused owing to the IP addresses all being allocated. Alternatively, the message may be transmitted autonomously by the UP function, e.g., in response to a subscription request from the CP function. In this case, the message may be transmitted responsive to the usage level exceeding a threshold, for example. Examples of this embodiment are shown below in FIGS. 4 and 5.

More than one indication of the usage level (e.g., in IEs of the same type) may be included to represent the usage levels for different UE IP address pools and/or different Network Instances.

According to some embodiments, where the message transmitted in step 604 comprises a response to a request to allocate an IP address to a UE, and the request resulted in failure owing to a fully allocated range of IP addresses in the UP function, the message may additionally comprise an indication that the failure to allocate an IP address to a UE was caused by the range of IP addresses in the UP function being used up. The indication may comprise a cause value corresponding to that meaning. See Table 8, for example.

Figure 7:
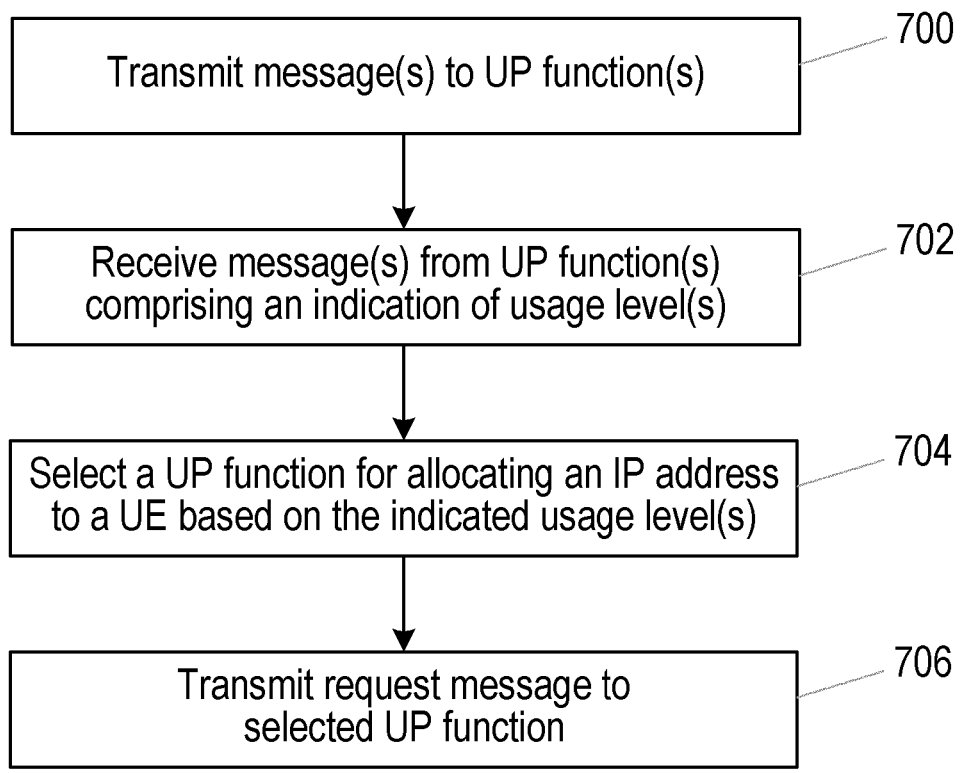
FIG. 7 is a flowchart illustrating a method implemented at a control plane core network function according to an embodiment of the disclosure.

FIG. 7 is a flowchart illustrating a method implemented at a CP entity according to an embodiment of the disclosure. The flowchart may correspond in some parts to signaling performed by the UP function in any of FIGS. 2 to 5. The CP entity may correspond to a SMF or a PGW-C, for example.

At block 700, the CP function transmits one or more messages to one or more UP functions. The UP functions may correspond to a UPF or a PGW-U, for example. The UP functions are configured with a range of IP addresses for allocation to UEs. The range of IP addresses configured in the UP function may comprise one or more UE IP address pools. Each of the UE IP address pools may be associated with a particular network instance configured in the UP entity. That is, each network instance of the UP function may be associated with one or more UE IP address pools.

The messages transmitted in block 700 may comprise requests for the UP functions to allocate IP addresses to UEs, for example, when establishing PDU/PDN sessions for those UEs. See FIGS. 2 and 3, for example. Alternatively or additionally, the messages may comprise subscription requests for the UP functions to report their usage levels. See FIG. 5, for example. The subscription request message may comprise one or more conditions upon which the usage level should be reported. For example, the conditions may include one or more of: a threshold usage level above which the usage level should be reported; a threshold usage level below which the usage level should stop being reported; how often the usage level should be reported. In one embodiment, the conditions may comprise a plurality of threshold values such that the UP functions report their usage levels when the usage levels move past a particular threshold value.

At block 702, the CP function receives one or more messages from one or more UP functions. At least one of the messages comprises an indication of the usage level of the range of IP addresses in the respective UP function. The indication of the usage level may comprise an indication of the proportion of the range of IP addresses which is currently allocated, such as a percentage. The indication of the proportion may be implicit or explicit. In the former case, for example, the indication may be of the proportion of the range of IP addresses which is currently available. As IP addresses may be either allocated or available, an indication of the proportion of the former is an implicit indication of the proportion of the latter, and vice versa. The indication of the usage level may additionally or alternatively comprise an absolute number of available IP addresses in the range. Again, the indication of the absolute number may be implicit or explicit. In the former case, for example, the indication may comprise an indication of the total number of IP addresses in the range (both available and allocated) and the number of allocated IP addresses. The number of available IP addresses can thus be derived from these quantities by subtraction.

According to some embodiments of the disclosure, the message may comprise a sequence number associated with the indication of a usage level of the range of IP addresses, which enables the CP function to determine the current usage level in the UP function, and not a previously indicated usage level, by utilizing the usage level with the most recent (e.g., highest) sequence number. In some embodiments, this sequence number is incremented with each indication of usage level (e.g., each transmission of the UE IP Address Allocation Information IE); alternatively, the sequence number may be incremented each time the usage level changes.

The messages received in step 702 may comprise a response message to the request from the CP function for allocation of an IP address to a UE. Examples of this embodiment are shown above in FIGS. 2 and 3 (see, e.g., steps 3 in those Figures). The indication of the usage level may be included in such messages responsive to the usage level exceeding a threshold, for example. In this way, network resources are not utilized for reporting the usage level unless and until the usage level reaches a value at which it becomes likely that a request to allocate an IP address to a UE may be refused owing to the IP addresses all being allocated. Alternatively, the message may be transmitted autonomously by the UP function. In this case, the message may be received responsive to the usage level exceeding a threshold, for example. Examples of this embodiment are shown below in FIGS. 4 and 5.

More than one indication of the usage level (e.g., in IEs of the same type) may be included in a message received in step 702, e.g., where the usage levels for different UE IP address pools and/or different Network Instances are included.

According to some embodiments, where a message received in step 702 comprises a response to a request to allocate an IP address to a UE, and the request resulted in failure owing to a fully allocated range of IP addresses in the UP function, the message may additionally comprise an indication that the failure to allocate an IP address to a UE was caused by the range of IP addresses in the UP function being used up. The indication may comprise a cause value corresponding to that meaning. See Table 8, for example.

In step 704, the CP function selects a UP function for allocating an IP address to a UE based on, or as a function of, the indicated usage levels received in step 702. For example, the CP function may adapt an algorithm used to select UP functions to allocate IP addresses to a UE. The algorithm may be adapted such that a UP function with relatively high usage levels is less likely to be selected, or is selected less often, than UP functions with relatively low usage levels. In one embodiment, the algorithm may be adapted such that the UP function is not selected to allocate IP addresses to UEs. The UP function may be selected based on one or more additional parameters, such as the location of the UP function with respect to the CP function or the UE (UP functions which are closer to the CP function or the UE may be preferred to those which are further away); the current load of the UP function; the capabilities of the UP function; and the static capacity of the UP function. Those skilled in the art will appreciate that these parameters may be combined in any suitable way in order to select a UP function.

In step 706, the CP function transmits a request message to the selected UP function, for the UP function to allocate an IP address to the UE.

Figure 8:
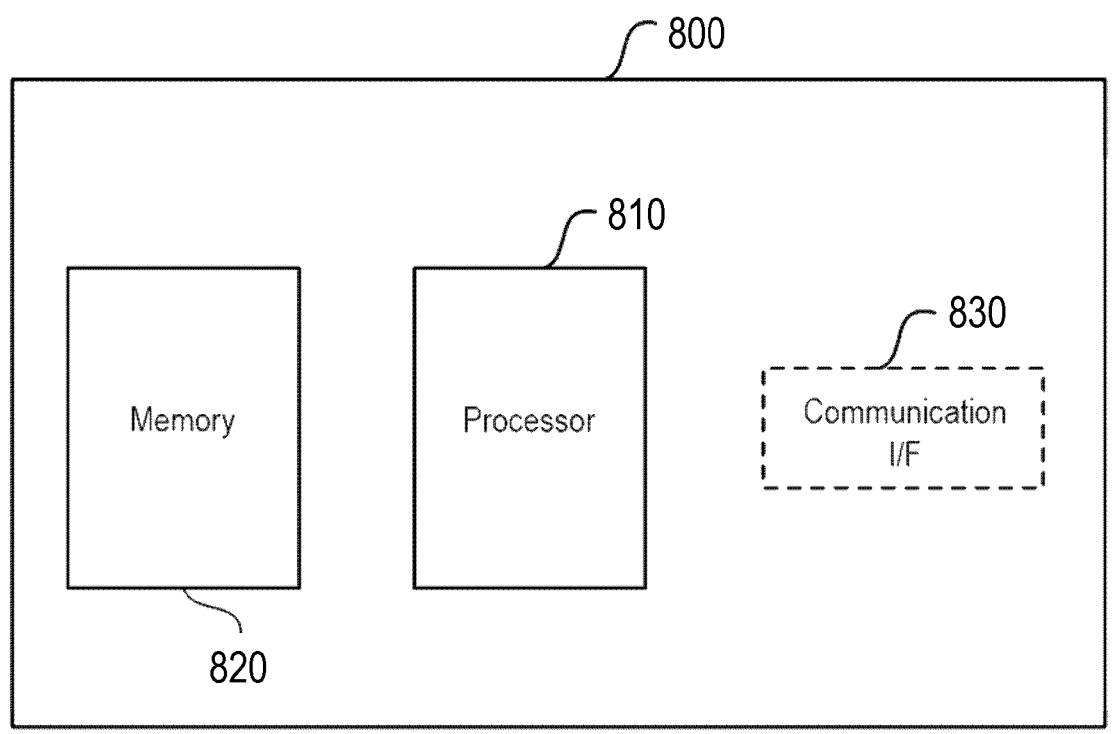
FIG. 8 is a block diagram showing an apparatus suitable for use in practicing some embodiments of the disclosure.

FIG. 8 is a block diagram showing an apparatus suitable for use in practicing some embodiments of the disclosure. For example, any one of the UP function and the CP function described above may be implemented through the apparatus 800. As shown, the apparatus 800 may include a processor 810, a memory 820 that stores a program, and optionally a communication interface 830 for communicating data with other external devices through wired and/or wireless communication.

The program includes program instructions that, when executed by the processor 810, enable the apparatus 800 to operate in accordance with the embodiments of the present disclosure, as discussed above. That is, the embodiments of the present disclosure may be implemented at least in part by computer software executable by the processor 810, or by hardware, or by a combination of software and hardware. For example, the program instructions may enable the apparatus 800, particularly when implementing a UP function, to perform the method set out in FIG. 6, or the signaling of the UP function shown in any of FIGS. 2 to 5. In another example, the program instructions may enable the apparatus 800, particularly when implementing a CP function, to perform the method set out in FIG. 7, or the signaling of the CP function shown in any of FIGS. 2 to 5.

The memory 820 may be of any type suitable to the local technical environment and may be implemented using any suitable data storage technology, such as semiconductor based memory devices, flash memories, magnetic memory devices and systems, optical memory devices and systems, fixed memories and removable memories. The processor 810 may be of any type suitable to the local technical environment, and may include one or more of general purpose computers, special purpose computers, microprocessors, digital signal processors (DSPs) and processors based on multi-core processor architectures, as non-limiting examples.

Figure 9:
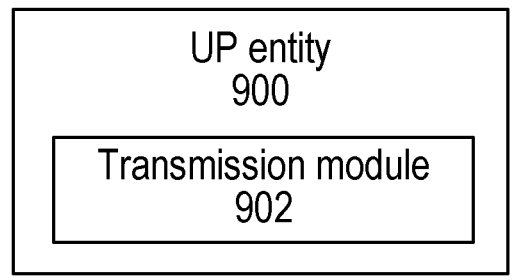
FIG. 9 is a block diagram showing a user plane entity according to an embodiment of the disclosure.

FIG. 9 is a block diagram showing a UP entity 900 according to an embodiment of the disclosure. The UP entity 900 may be configured with a range of IP addresses for allocation to UEs. As shown, the UP entity 900 comprises a transmitting module 902. The transmitting module 902 may be configured to transmit a message to a control plane core network function, the message comprising an indication of a usage level of the range of IP addresses.

Figure 10:
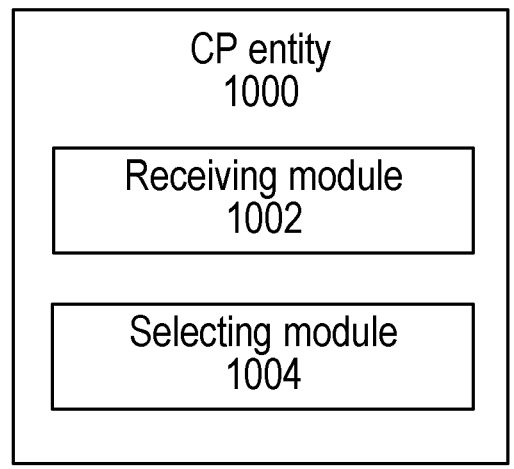
FIG. 10 is a block diagram showing a control plane entity according to an embodiment of the disclosure.

FIG. 10 is a block diagram showing a CP entity 1000 according to an embodiment of the disclosure. As shown, the CP entity 1000 comprises a receiving module 1002 and a selecting module 1004. The receiving module 1002 may be configured to receive messages from one or more user plane core network functions, configured with respective ranges of IP addresses for allocation to UEs. The messages comprise an indication of a usage level of the range of IP addresses. The selecting module 1004 may be configured to select a user plane core network function for allocating an IP address to a UE based on the indicated usage levels.

The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

TABLE 1

Information Elements in a PFCP Session Establishment Response

| Information elements | P | Condition/Comment | Sx a | Sx b | Sx c | N4 | IE Type |
|---|---|---|---|---|---|---|---|
| Node ID | M | This IE shall contain the unique identifier of the sending Node. | X | X | X | X | Node ID |
| Cause | M | This IE shall indicate the acceptance or the rejection of the corresponding request message. | X | X | X | X | Cause |
| Offending IE | C | This IE shall be included if the rejection is due to a conditional or mandatory IE missing or faulty. | X | X | X | X | Offending IE |

TABLE 1-continued

Information Elements in a PFCP Session Establishment Response

| Information elements | P | Condition/Comment | Appl. Sx a | Sx b | Sx c | N4 | IE Type |
|---|---|---|---|---|---|---|---|
| UP F-SEID | C | This IE shall be present if the cause is set to "Request accepted (success)". When present, it shall contain the unique identifier allocated by the UP function identifying the session. | X | X | X | X | F-SEID |
| Created PDR | C | This IE shall be present if the cause is set to "success" and the UP function was requested to allocate a local F-TEID or a UE IP address/prefix for the PDR. When present, this IE shall contain the PDR information associated to the PFCP session. There may be several instances of this IE. See table 7.5.3.2-1. | X | X | — | X | Created PDR |
| Load Control Information | O | The UP function may include this IE if it supports the load control feature and the feature is activated in the network. See Table 7.5.3.3-1. | X | X | X | X | Load Control Information |
| Overload Control Information | O | During an overload condition, the UP function may include this IE if it supports the overload control feature and the feature is activated in the network. See Table 7.5.3.4-1. | X | X | X | X | Overload Control Information |
| UE IP Address Allocation Information | O | The UP function may include this IE if it supports the UP function allocating UE IP address feature and the feature is activated in the network. See Table 7.X.X.X-1 | — | X | — | X | UE IP Address Allocation Information |
| SGW-U FQ-CSID | C | This IE shall be included according to the requirements in clause 23 of 3GPP TS 23.007 [24]. | X | — | — | — | FQ-CSID |
| PGW-U FQ-CSID | C | This IE shall be included according to the requirements in clause 23 of 3GPP TS 23.007 [24]. | — | X | — | — | FQ-CSID |
| Failed Rule ID | C | This IE shall be included if the Cause IE indicates a rejection due to a rule creation or modification failure. | X | X | X | X | Failed Rule ID |
| Created Traffic Endpoint | C | This IE shall be present if the cause is set to "success" and the UP function was requested to allocate a local F-TEID or a UE IP address/prefix in a Create Traffic Endpoint IE. When present, it shall contain the local F-TEID or UE IP address/prefix to be used for this Traffic Endpoint. There may be several instances of this IE. | X | X | — | X | Created Traffic Endpoint |
| Created Bridge Info for TSC | C | This IE shall be present if the UPF was requested to provide Bridge information for TSC in the PFCP Session Establishment Request. When present, it shall contain the Bridge information for TSC for the PFCP session. See Table 7.5.3.6-1. | — | — | — | X | Created Bridge Info for TSC |
| ATSSS Control Parameters | C | This IE shall be present if ATSSS functionality is required in the request message and the UPF allocates the resources and parameters corresponding to the required ATSSS functionality. See Table 7.5.3.7-1. | — | — | — | X | ATSSS Control Parameters |

TABLE 2

Information Elements in a PFCP Session Modification Response

| Information elements | P | Condition/Comment | Appl. Sx a | Sx b | Sx c | N4 | IE Type |
|---|---|---|---|---|---|---|---|
| Cause | M | This IE shall indicate the acceptance or the rejection of the corresponding request message. | X | X | X | X | Cause |
| Offending IE | C | This IE shall be included if the rejection is due to a conditional or mandatory IE missing or faulty. | X | X | X | X | Offending IE |
| Created PDR | C | This IE shall be present if the cause is set to "success", new PDR(s) were requested to be created and the UP function was requested to allocate the local F-TEID or a UE IP address/prefix for the PDR(s). When present, this IE shall contain the PDR information associated to the PFCP session. See Table 7.5.3.2-1. | X | X | — | X | Created PDR |
| Load Control Information | O | The UP function may include this IE if it supports the load control feature and the feature is activated in the network. See Table 7.5.3.3-1. | X | X | X | X | Load Control Information |

TABLE 2-continued

Information Elements in a PFCP Session Modification Response

| Information elements | P | Condition/Comment | Appl. Sx a | Sx b | Sx c | N4 | IE Type |
|---|---|---|---|---|---|---|---|
| Overload Control Information | O | During an overload condition, the UP function may include this IE if it supports the overload control feature and the feature is activated in the network. | X | X | X | X | Overload Control Information |
| UE IP Address Allocation Information | O | The UP function may include this IE if it supports the UP function allocating UE IP address feature and the feature is activated in the network. See Table 7.X.X.X-1 | — | X | — | X | UE IP Address Allocation Information |
| Usage Report | C | This IE shall be present if: the Query URR IE was present or the QAURR flag was set to "1" in the PFCP Session Modification Request, traffic usage measurements for that URR are available at the UP function, and the UP function decides to return some or all of the requested usage reports in the PFCP Session Modification Response. This IE shall be also present if: a URR or the last PDR associated to a URR has been removed, non-null traffic usage measurements for that URR are available in the UP function, and the UP function decides to return some or all of the related usage reports in the PFCP Session Modification Response (see clause 5.2.2.3.1). Several IEs within the same IE type may be present to represent a list of Usage Reports. | X | X | X | X | Usage Report |
| Failed Rule ID | C | This IE shall be included if the Cause IE indicates a rejection due to a rule creation or modification failure. | X | X | X | X | Failed Rule ID |
| Additional Usage Reports Information | C | This IE shall be included if the Query URR IE was present or the QAURR flag was set to "1" in the PFCP Session Modification Request, and usage reports need to be sent in additional PFCP Session Report Request messages (see clause 5.2.2.3.1). When present, this IE shall either indicate that additional usage reports will follow, or indicate the total number of usage reports that need to be sent in PFCP Session Report Request messages. | X | X | X | X | Additional Usage Reports Information |
| Created/Updated Traffic Endpoint | C | This IE shall be present if the cause is set to "success", Traffic Endpoint(s) were requested to be created or updated, and the UP function was requested to allocate the local F-TEID or a UE IP address/prefix for the Traffic Endpoint(s). When present, this IE shall contain the Traffic Endpoint information associated to the PFCP session. See Table 7.5.3.5-1. | X | X | — | X | Created Traffic Endpoint |
| Port Management Information for TSC | C | This IE shall be present if the UPF needs to send Port Management information for TSC to the SMF. | — | — | — | X | Port Management Information for TSC |
| ATSSS Control Parameters | C | This IE shall be present if ATSSS functionality is required in the request message, and the UPF allocates the resources and parameters corresponding to the required ATSSS functionality. See Table 7.5.3.7-1. | — | — | — | X | ATSSS Control Parameters |
| Updated PDR | C | This IE shall be present if a PDR previously created for the PFCP session needs to be modified to support the redundant transmission on N3/N9 interfaces. See Table 7.5.9.3-1. Several IEs within the same IE type may be present to represent a list of PDRs to update. | — | — | — | X | Updated PDR |

TABLE 3

Load Control Information IE within PFCP Session Establishment Response

Octet 1 and 2
Load Control Information IE Type = 51 (decimal)
Octets 3 and 4
Length = n

| Information elements | P | Condition/Comment | Appl. Sx a | Sx b | Sx c | N4 | IE Type |
|---|---|---|---|---|---|---|---|
| Load Control Sequence Number | M | See clause 6.2.3.3.2 for the description and use of this parameter. | X | X | X | X | Sequence Number |
| Load Metric | M | See clause 6.2.3.3.2 for the description and use of this parameter. | X | X | X | X | Metric |
| UE IP Address Allocation Information | O | See Table xxxx-1 for the contents. | — | X | — | X | Metric |

TABLE 4

| Information Elements in a PFCP Association Update Request |||||
|---|---|---|---|---|
| Information elements | P | Condition/Comment | | IE Type |
| Node ID | M | This IE shall contain the unique identifier of the sending Node. | | Node ID |
| UP function Features | O | If present, this IE shall indicate the supported Features when the sending node is the UP function. | | UP function Features |
| CP function Features | O | If present, this IE shall indicate the supported Features when the sending node is the CP function. | | CP function Features |
| PFCP Association Release Request | C | This IE shall be present if the UP function requests the CP function to release the PFCP association. | | PFCP Association Release Request |
| Graceful Release Period | C | This IE shall be present if the UP function requests a graceful release of the PFCP association. | | Graceful Release Period |
| PFCPAUReq-Flags | O | This IE shall be included if at least one of the flags is set to "1". PARPS (PFCP Association Release Preparation Start): if both the CP function and UP function support the EPFAR feature, the CP or UP function may set this flag to "1" to indicate that the PFCP association is to be released and all non-zero usage reports for those PFCP Sessions affected by the release of the PFCP association shall be reported. | | PFCPAUReq-Flags |
| Alternative SMF IP Address | O | This IE may be present if the SMF advertises the support of the SSET and/or MPAS feature in the CP function Features IE (see clause 8.2.58). When present, this IE shall contain an IPv4 and/or IPv6 address of an alternative SMF or an alternative PFCP entity in the same SMF when SSET feature is used, or an alternative PFCP entity in the same SMF when MPAS feature is used. Several IEs with the same IE type may be present to represent multiple alternative SMF IP addresses. | | Alternative SMF IP Address |
| Clock Drift Control Information | C | This IE shall be present if the Clock Drift Control Information needs to be modified (see clause 5.26.4). Several IEs with the same IE type may be present to represent TSN domains. When present, the UPF shall replace any Clock Drift control information received earlier with the new received information. A Clock Drift Control Information with a null length indicates that clock drift reporting shall be stopped. See Table 7.4.4.1.2-1. | | Clock Drift Control Information |
| UE IP address Pool Information | O | This IE may be present when the UP function sends this message, if UE IP Address Pools are configured in the UP function. Several IE with the same IE type may be present to represent multiple UE IP address Pool Information. The IE shall be encoded as in Table 7.4.4.1-3. | | UE IP address Pool Information |

TABLE 4-continued

Information Elements in a PFCP Association Update Request

| Information elements | P | Condition/Comment | IE Type |
|---|---|---|---|
| GTP-U Path QoS Control Information | C | This IE shall be present if the GTP-U Path QoS Control Information needs to be modified (see clause 5.24.5). Several IEs with the same IE type may be present to represent multiple GTP-U paths to monitor. When present, the UPF shall replace any GTP-U path control information received earlier with the new received information. A GTP-U Path QoS Control Information with a null length indicates that QoS monitoring of GTP-U paths shall be stopped. See Table 7.4.4.1.3-1. | GTP-U Path QoS Control Information |
| UE IP Address Allocation Information | O | The UP function may include this IE if it supports the UP function allocating UE IP address feature and the feature is activated in the network. See Table 7.X.X.X-1See Table 7.X.X.X-1 | |

TABLE 5

Information Elements in a PFCP Association Setup Request

| Information elements | P | Condition/Comment | IE Type |
|---|---|---|---|
| Node ID | M | This IE shall contain the unique identifier of the sending Node. | Node ID |
| Recovery Time Stamp | M | This IE shall contain the time stamp when the CP or UP function was started, see clause 19A of 3GPP TS 23.007 [24]. (NOTE) | Recovery Time Stamp |
| UP Function Features | C | This IE shall be present if the UP function sends this message and the UP function supports at least one UP feature defined in this IE. When present, this IE shall indicate the features the UP function supports. | UP Function Features |
| CP Function Features | C | This IE shall be present if the CP function sends this message and the CP function supports at least one CP feature defined in this IE. When present, this IE shall indicate the features the CP function supports. | CP Function Features |
| Alternative SMF IP Address | O | This IE may be present if the SMF advertises the support of the SSET and/or MPAS feature in the CP Function Features IE (see clause 8.2.58). When present, this IE shall contain an IPv4 and/or IPv6 address of an alternative SMF or an alternative PFCP entity in the same SMF when SSET feature is used, or an alternative PFCP entity in the same SMF when MPAS feature is used. Several IEs with the same IE type may be present to represent multiple alternative SMF IP addresses. | Alternative SMF IP Address |
| SMF Set ID | C | This IE shall be present if the SMF advertises the support of the MPAS feature in the CP Function Features IE (see clause 5.22.3). When present, this IE shall contain an FQDN representing the SMF set to which the SMF belongs. | SMF Set ID |
| PFCP Session Retention Information | O | This IE may be present to request the UP function to keep all or part of the existing PFCP sessions upon receipt of a PFCP association setup request with a Node ID for which a PFCP association was already established. See clause 6.2.6.2.1. | PFCP Session Retention Information |
| UE IP address Pool Information | O | This IE may be present when the UP function sends this message, if UE IP Address Pools are configured in the UP function. Several IE with the same IE type may be present to represent multiple UE IP address Pool Information. | UE IP address Pool Information |
| GTP-U Path QoS Control Information | C | This IE may be present, if the CP function sends this message, to request the UPF to monitor the QoS on GTP-U paths (see clause 5.24.5). Several IEs with the same IE type may be present to represent multiple GTP-U paths (with different parameters) to monitor. | GTP-U Path QoS Control Information |

TABLE 5-continued

Information Elements in a PFCP Association Setup Request

| Information elements | P | Condition/Comment | IE Type |
|---|---|---|---|
| Clock Drift Control Information | O | This IE may be present, if the CP function sends this message, to request the UPF to report clock drift between the TSN time and 5GS time for TSN working domains (see clause 5.26.4). Several IEs with the same IE type may be present for multiple TSN Time domains (with different parameters). | Clock Drift Control Information |
| UE IP Address Allocation Information | O | This IE may be present, if the CP function sends this message, to request the UPF to report UE IP Address Allocation Information. | UE IP Address Allocation Information |
| UPF Instance ID | O | This IE may be present if the UP function is a 5G UPF and if available, and if the message is sent by the UPF. | NF Instance ID |

(NOTE):
A PFCP function shall ignore the Recovery Timestamp received in the PFCP Association Setup Request message.

TABLE 6

Information Elements in PFCP Node Report Request

| Information elements | P | Condition/Comment | Appl. Sx a | Sx b | Sx c | N4 | IE Type |
|---|---|---|---|---|---|---|---|
| Node ID | M | This IE shall contain the unique identifier of the sending Node. | X | X | X | X | Node ID |
| Node Report Type | M | This IE shall indicate the type of the report. | X | X | X | X | Node Report Type |
| User Plane Path Failure Report | C | This IE shall be present if the Node Report Type indicates a User Plane Path Failure Report. | X | X | — | X | User Plane Path Failure Report |
| User Plane Path Recovery Report | C | This IE shall be present if the Node Report Type indicates a User Plane Path Recovery Report. | X | X | — | X | User Plane Path Recovery Report |
| Clock Drift Report | C | This IE shall be present if the Node Report Type indicates a Clock Drift Report. More than one IE with this type may be included to send Clock Drift Reports for different TSN Time Domain Numbers. | — | — | — | X | Clock Drift Report |
| GTP-U Path QoS Report | C | This IE shall be present if the Node Report Type indicates a GTP-U Path QoS Report. More than one IE with this type may be included to represent multiple remote GTP-U peers for which QoS information is reported. | — | — | — | X | GTP-U Path QoS Report |
| UE IP Address Allocation Information | | This IE shall be present if the Node Report Type indicates a UE IP Address Allocation Information. See Table 7.X.X.X-1 | — | X | — | X | UE IP Address Allocation Information |

TABLE 7

UE IP Address Allocation Information IE within PFCP Node Report Request

Octet 1 and 2
Load Control Information IE Type = 51 (decimal)
Octets 3 and 4
Length = n

| Information elements | P | Condition/Comment | Appl. Sx a | Sx b | Sx c | N4 | IE Type |
|---|---|---|---|---|---|---|---|
| UE IP Address Allocation Sequence Number | M | This parameter shall be used by the receiver of the UE IP Address Allocation Information IE to properly collate out-of-order Allocation Information, e.g. due to PFCP retransmissions. This parameter shall also be used by the receiver to determine whether the newly received UE IP address allocation information has changed compared to UE IP address allocation information previously received from the same node earlier. | — | X | — | X | Sequence Number |

TABLE 7-continued

UE IP Address Allocation Information IE within PFCP Node Report Request

Octet 1 and 2
Load Control Information IE Type = 51 (decimal)
Octets 3 and 4
Length = n

| Information elements | P | Condition/Comment | Appl. Sxa | Sxb | Sxc | N4 | IE Type |
|---|---|---|---|---|---|---|---|
| UE IP Address Allocation Metric | M | This parameter represents the current UE IP address allocation level of the sending node as a percentage within the range of 0 to100, where 0 means no or 0% usage and 100 means maximum or 100% usage reached (i.e. no further PFCP Session Establishment Request received is desirable). | — | X | — | X | Metric |
| Number of UE IP address | M | The available number of UE IP addresses per UE IP Address pool | — | X | — | X | Integer |
| Network Instance | O | If present, this IE shall identify the Network instance to match for the incoming packet. See NOTE 1, NOTE2. | — | X | — | X | |
| UE IP Address Pool Id | O | This IE may be present if UE IP Addresses Pools are configured in the UPF. When present, this IE shall contain the identity of a UE IP address Pool configured in the UPF. | — | X | — | X | |

TABLE 8

Cause values

| Message Type | Cause value (decimal) | Meaning | Description |
|---|---|---|---|
| | 0 | Reserved. | Shall not be sent and if received the Cause shall be treated as an invalid IE |
| Acceptance in a response | 1 | Request accepted (success) | "Request accepted (success)" is returned when the PFCP entity has accepted a request. |
| | 2 | More Usage Report to send | This cause shall be returned by the UP function in the PFCP Session Deletion Response message when it has more usage reports to send. (See clause 5.2.2.3.1) |
| | 3-63 | Spare. | This value range shall be used by Cause values in an acceptance response message. See NOTE 1. |
| Rejection in a response | 64 | Request rejected (reason not specified) | This cause shall be returned to report an unspecified rejection cause |
| | 65 | Session context not found | This cause shall be returned, if the F-SEID included in a PFCP Session Modification/Deletion Request message is unknown. |
| | 66 | Mandatory IE missing | This cause shall be returned when the PFCP entity detects that a mandatory IE is missing in a request message |
| | 67 | Conditional IE missing | This cause shall be returned when the PFCP entity detects that a Conditional IE is missing in a request message. |
| | 68 | Invalid length | This cause shall be returned when the PFCP entity detects that an IE with an invalid length in a request message |
| | 69 | Mandatory IE incorrect | This cause shall be returned when the PFCP entity detects that a Mandatory IE is incorrect in a request message, e.g. the Mandatory IE is malformed or it carries an invalid or unexpected value. |
| | 70 | Invalid Forwarding Policy | This cause shall be used by the UP function in the PFCP Session Establishment Response or PFCP Session Modification Response message if the CP function attempted to provision a FAR with a Forwarding Policy Identifier for which no Forwarding Policy is locally configured in the UP function. |
| | 71 | Invalid F-TEID allocation option | This cause shall be used by the UP function in the PFCP Session Establishment Response or PFCP Session Modification Response message if the CP function attempted to provision a PDR with a F-TEID allocation |

TABLE 8-continued

Cause values

| Message Type | Cause value (decimal) | Meaning | Description |
|---|---|---|---|
| | | | option which is incompatible with the F-TEID allocation option used for already created PDRs (by the same or a different CP function). |
| | 72 | No established PFCP Association | This cause shall be used by the CP function or the UP function if they receive a PFCP message other than the PFCP Association Setup Request and the Heartbeat Request message from a peer with which there is no established PFCP Association. |
| | 73 | Rule creation/modification Failure | This cause shall be used by the UP function if a received Rule failed to be stored and be applied in the UP function. |
| | 74 | PFCP entity in congestion | This cause shall be returned when a PFCP entity has detected node level congestion and performs overload control, which does not allow the request to be processed. |
| | 75 | No resources available | This cause shall be returned to indicate a temporary unavailability of resources to process the received request. |
| | 76 | Service not supported | This cause shall be returned when a PFCP entity receives a message requesting a feature or service that is not supported. |
| | 77 | System failure | This cause shall be returned to indicate a system error condition. |
| | 78 | Redirection Requested | This cause may be returned to indicate a request to the UPF to redirect its PFCP request to a different SMF. |
| | xx | All dynamic addresses are occupied | This cause may be returned if the UE IP address is to be assigned by UP function but, when all dynamic IP addresses configured in the UP function are occupied or when all dynamic IP addresses in the UE IP address Pool indicated by the CP function are occupied. |
| | xx to 255 | Spare for future use in a response message. See NOTE 2. | This value range shall be used by Cause values in a rejection response message. See NOTE 2. |

NOTE 1:
This value is or may be used in future version of the specification. If the receiver cannot comprehend the value, it shall be interpreted as an unspecified acceptance cause. Unspecified/unrecognized acceptance cause shall be treated in the same ways as the cause value 1 "Request accepted (success)".
NOTE 2:
This value is or may be used in a future version of the specification. If the receiver cannot comprehend the value, it shall be interpreted as an unspecified rejection cause. Unspecified/unrecognized rejection cause shall be treated in the same ways as the cause value 64 "Request rejected (reason not specified)".

What is claimed is:

1. A method performed by a user plane core network function for a wireless communication network, the user plane core network function being configured with a range of Internet Protocol, IP, addresses for allocation to user equipments, UEs, the method comprising:
   if a proportion of the IP addresses that are occupied exceeds a threshold, transmitting a message to a control plane core network function, the message comprising an indication of a usage level of the range of IP addresses.

2. The method according to claim 1, wherein the indication of the usage level of the range of IP addresses comprises an indication of a portion of the range of IP addresses which have been allocated to UEs; wherein the indication of the portion of the range of IP addresses which have been allocated to UEs comprises a percentage of the range of IP addresses which have been allocated to UEs.

3. The method according to claim 1, wherein the message further comprises a sequence number for the indication of the usage level of the range of IP addresses.

4. The method according to claim 1, wherein the message comprises a Packet Forwarding Control Protocol, PFCP, Association Update Request message.

5. The method according to claim 1, wherein the method further comprises: obtaining the usage level of the range of IP addresses in the user plane core network function.

6. The method according to claim 1, wherein the method further comprises:
   receiving a request message from the control plane core network function, and wherein the message is transmitted in response to the request message from the control plane core network function; wherein the request message indicates that usage level of IP address range reporting feature is supported by the control plane core network function.

7. A method performed by a user plane core network function for a wireless communication network, the user plane core network function being configured with a range of Internet Protocol, IP, addresses for allocation to user equipments, UEs, the method comprising:
   transmitting a message to a control plane core network function, the message comprising an indication of a usage level of the range of IP addresses, such that the control plane core network function is enabled to select, at least based on the indicated usage level, a user plane core network function for allocating an IP address to a UE; and receiving a request message from the control plane core network function, and wherein the message is transmitted in response to the request message from the control plane core network function; wherein the request message indicates that usage level of IP address range reporting feature is supported by the control plane core network function, wherein the request message from the control plane core network function comprises a request to allocate an IP address to a UE, wherein the message indicates that allocation of an IP address to the UE failed, and wherein the message further comprises an indication that the allocation of an IP address to the UE failed owing to lack of available IP addresses in the range of IP addresses configured in the user plane core network function.

8. A method performed by a user plane core network function for a wireless communication network, the user plane core network function being configured with a range of Internet Protocol, IP, addresses for allocation to user equipments, UEs, the method comprising:

transmitting a message to a control plane core network function, the message comprising an indication of a usage level of the range of IP addresses, such that the control plane core network function is enabled to select, at least based on the indicated usage level, a user plane core network function for allocating an IP address to a UE;

obtaining the usage level of the range of IP addresses in the user plane core network function; and rejecting or not responding to a PFCP Session Establishment Request message any more when determining that the usage level of the range of IP addresses has reached 100%.

9. The method according to claim 1, wherein the user plane core network function comprises a packet data network gateway user plane, PGW-U, or a user plane function, UPF.

10. The method according to claim 1, wherein the user plane core network function is further configured with a network instance, and wherein the range of IP addresses for allocation to UEs corresponds to a UE IP address pool belonging to the network instance.

11. A method performed by a control plane core network function for a wireless communication network, the wireless communication network comprising a user plane core network function configured with a range of Internet Protocol, IP, addresses for allocation to user equipments, UEs, the method comprising:

if a proportion of the IP addresses that are occupied exceeds a threshold, receiving a message from the user plane core network function, the messages comprising an indication of a usage level of the range of IP addresses; and selecting, at least based on the usage level, the user plane core network function for allocating an IP address to a UE.

12. The method according to claim 11, wherein the indication of the usage level of the range of IP addresses comprises an indication of a portion of the range of IP addresses which have been allocated to UEs; wherein the indication of the portion of the range of IP addresses which have been allocated to UEs comprises a percentage of the range of IP addresses which have been allocated to UEs.

13. The method according to claim 11, wherein the message further comprises a sequence number for the indication of the usage level of the range of IP addresses, to enable the control plane core network function to distinguish between a current usage level of the range of IP addresses and previous usage levels of the range of IP addresses.

14. The method according to claim 11, wherein the message comprises a Packet Forwarding Control Protocol, PFCP, Association Update Request message.

15. A method performed by a control plane core network function for a wireless communication network, the method comprising:

receiving one or more messages from one or more user plane core network functions, the user plane core network functions being configured with respective ranges of Internet Protocol, IP, addresses for allocation to user equipments, UEs, at least one of the messages comprising an indication of a usage level of the range of IP addresses; and selecting, at least based on the indicated usage levels, a user plane core network function for allocating an IP address to a UE, wherein a first user plane core network function has a first indicated usage level, wherein a second user plane core network function has a second indicated usage level higher than the first indicated usage level, and wherein the control plane core network function selects the first user plane core network function for allocating an IP address with greater frequency or with higher likelihood than the second user plane core network function.

16. The method according to claim 11, wherein the user plane core network function is further configured with a network instance, and wherein the range of IP addresses for allocation to UEs corresponds to a UE IP address pool belonging to the network instance.

17. A network entity implementing a user plane core network function for a wireless communication network, the user plane core network function being configured with a range of Internet Protocol, IP, addresses for allocation to user equipments, UEs, the network entity comprising:

at least one processor; and at least one memory, the at least one memory containing instructions executable by the at least one processor, whereby the network entity is operative to:

if a proportion of the IP addresses that are occupied exceeds a threshold, transmit a message to a control plane core network function, the message comprising an indication of a usage level of the range of IP addresses.

18. A network entity implementing a control plane core network function for a wireless communication network, the wireless communication network comprising a user plane core network function configured with a range of Internet Protocol, IP, addresses for allocation to user equipments, UEs, the network entity comprising:

at least one processor; and at least one memory, the at least one memory containing instructions executable by the at least one processor, whereby the network entity is operative to:

if a proportion of the IP addresses that are occupied exceeds a threshold, receive a message from the user plane core network function, the message comprising an indication of a usage level of the range of IP addresses; and select, at least based on the usage level, the user plane core network function for allocating an IP address to a UE.

* * * * *